United States Patent
Xia et al.

(10) Patent No.: US 8,045,555 B2
(45) Date of Patent: Oct. 25, 2011

(54) METHOD AND APPARATUS FOR TUNNEL PACKET OPTIMIZATION

(75) Inventors: Yangsong Xia, Nanjing (CN); Chunqiang Li, Nanjing (CN)

(73) Assignee: FutureWei Technologies, Inc., Plano, TX (US)

( * ) Notice: Subject to any disclaimer, the term of this patent is extended or adjusted under 35 U.S.C. 154(b) by 215 days.

(21) Appl. No.: 12/476,078

(22) Filed: Jun. 1, 2009

(65) Prior Publication Data

US 2010/0046512 A1    Feb. 25, 2010

Related U.S. Application Data

(60) Provisional application No. 61/090,499, filed on Aug. 20, 2008.

(51) Int. Cl.
*H04L 12/56* (2006.01)

(52) U.S. Cl. ........ 370/389; 370/349; 370/392; 370/469; 709/230

(58) Field of Classification Search .................. 370/310, 370/331, 349, 392, 401
See application file for complete search history.

(56) References Cited

U.S. PATENT DOCUMENTS

| 7,602,786 | B2 * | 10/2009 | Dommety et al. | 370/392 |
| 2004/0146042 | A1 * | 7/2004 | Ideshita et al. | 370/349 |
| 2008/0080533 | A1 * | 4/2008 | Yamane | 370/401 |
| 2008/0198805 | A1 * | 8/2008 | Weniger et al. | 370/331 |
| 2008/0310334 | A1 * | 12/2008 | Nakamura et al. | 370/310 |

OTHER PUBLICATIONS

Bradner, S., "Key words for use in RFCs to Indicate Requirement Levels," BCP 14, RFC 2119, Mar. 1997, pp. 1-3.
Deering, S., et al., "Internet Protocol, Version 6 (IPv6) Specification," Standards Track, RFC 2460, Dec. 1998, pp. 1-39.
Johnson, D., et al., "Mobility Support in IPv6," Standards Track, RFC 3775, Jun. 2004, pp. 1-165.
Rajahalme, J., et al., "IPv6 Flow Label Specification," Standards Track, RFC 3697, Mar. 2004, 5 pages.
Haddad, W., et al., "IP Tunneling Optimization in a Mobile Environment," Internet-Draft, Jul. 13, 2008, pp. 1-18.

* cited by examiner

*Primary Examiner* — Dang Ton
*Assistant Examiner* — Mohamed Kamara
(74) *Attorney, Agent, or Firm* — Slater & Matsil, L.L.P.

(57) ABSTRACT

A method and apparatus for tunnel packet optimization is provided. A method for communications node operation where the communications node is at a beginning of a tunnel includes receiving a message from a communications device at an end of the tunnel, processing a packet having a first source address and a first destination address, and encapsulating the packet with an outer header having a second source address and a second destination address, thereby producing a tunnel packet. The message includes a flow label related to the first source address and the first destination address. The method also includes compacting the tunnel packet based on a tunnel optimization (TO) state, and transmitting the tunnel packet towards the second destination address. The second destination address includes an address of the communications device at the end of the tunnel.

20 Claims, 8 Drawing Sheets

METHOD AND APPARATUS FOR TUNNEL PACKET OPTIMIZATION

This application claims the benefit of U.S. Provisional Application No. 61/090,499, filed on Aug. 20, 2008, entitled "Using IPv6 Flow Label for MIPv6 Tunnel Optimization," which application is hereby incorporated herein by reference.

TECHNICAL FIELD

The present invention relates generally to communications, and more particularly to a method and apparatus for tunnel packet optimization.

BACKGROUND

In general, tunneling in computer networks involves the encapsulation of transmissions or packets in a first communications protocol within transmissions or packets of a second communications protocol. The first communications protocol and the second communications protocol may be the same communications protocol or they may be different. Tunneling may be used in a computer network to convey a payload over an incompatible delivery network or to provide a secure path through an untrusted network.

Mobile IPv6 (MIPv6) is an implementation of IPv6 that supports the exchange of data in a packet switched internetwork. MIPv6 allows an IPv6 node to be mobile, i.e., arbitrarily move about an IPv6 network while maintaining existing connections as well as reachability using an IPv6 address. FIG. 1 illustrates an internetwork 100. Internetwork 100 includes a mobile node (MN) 105 that communicates to a host 110, for example. Communications between MN 105 and host 110 go through a home agent (HA) 115, with an access router AR1 120 serving to allow MN 105 to connect to HA 115. All traffic to and from MN 105 should go through HA 115. For example, traffic between MN 105 and a host 110 go through HA 115. Tunneling is used for all traffic flowing between MN 105 and HA 115 (shown as tunnel 130), including traffic that originated at sources other than HA 115 and destined for destinations other than HA 115.

FIG. 2 illustrates a typical IPv6 packet 200. IPv6 packet 200 includes a header 205 and a payload 210. Header 205 may be used in the delivery of IPv6 packet 200 to its destination as well as to provide identification information, such as version 215, traffic class 217, flow label 219, payload length 221, next header 223, transmission hop limit 225, and so forth. Header 205 also includes a source address 227 and a destination address 229. Source address may be an IPv6 address of a source of IPv6 packet 200, while destination address may be an IPv6 address of its intended destination.

FIG. 3 illustrates a tunnel packet 300. As discussed previously, the use of tunneling results in the encapsulation of a transmission or packet of a first communications protocol within a transmission or packet of a second communications protocol. Tunnel packet 300 includes an IPv6 packet 200 comprising header 205 and payload 210. Header 205 may be referred to as an inner header. Tunnel packet 300 also includes an outer header 305. Outer header 305 may include information such as version, traffic class, flow label, payload length, next header, transmission hop limit, and so forth. Furthermore, outer header 305 may also include a source address 310 and a destination address 315. Depending on the source of IPv6 packet 200, the source address and destination address contained in inner header 205 may be the same as source address 310 and destination address 315. Tunnel packet 300 may also include additional extension headers 320.

Given that a standard IPv6 header is 40 bytes (one byte is equal to eight bits) in size, tunnel packet 300 has at least 40 bytes dedicated to headers (assuming that outer header is also an IPv6 header). When large numbers of tunnel packets are transmitted between a source-destination pair, a significant amount of information transmitted is wasted in header overhead.

A prior art technique for reducing tunnel packet overhead is proposed in "IP Tunneling Optimization in a Mobile Environment," by W. Haddad, M. Naslund, and P. Nikander, draft-haddad-mipshop-tunneling-optimization-01, Jul. 13, 2008. However, the proposed solution limits a care of address (CoA) to a single correspondent node (CN). Therefore, if a MN is communicating with multiple CNs, then multiple CoAs are required, which also require multiple binding cache (BC) entries in a HA. Multiple CoA address configurations and BC entries increases memory consumption and may counteract the benefits introduced through reduced packet size. Furthermore, multiple CoAs may also introduce increased accounting complexity.

SUMMARY OF THE INVENTION

These and other problems are generally solved or circumvented, and technical advantages are generally achieved, by embodiments of a method and apparatus for tunnel packet optimization.

In accordance with an embodiment, a method for communications node operation is provided. The communications node is at a beginning of a tunnel. The method includes receiving a message from a communications device at an end of the tunnel, processing a packet, and encapsulating the packet with an outer header to produce a tunnel packet. The message includes a flow label related to a first source address and a first destination address, the packet includes the first source address and the first destination address, and the outer header includes a second source address and a second destination address. The method also includes compacting the tunnel packet based on a tunnel optimization (TO) state in response to determining that the TO state corresponding to the first source address and the first destination address exists at the communications node, and transmitting the tunnel packet towards the second destination address. The second destination address includes an address of the communications device at the end of the tunnel, and the communications node uses an Internet Protocol version 6 protocol.

In accordance with another embodiment, a method for communications node operation is provided. The communications node is at an end of a tunnel. The method includes receiving a tunnel packet having an outer header, extracting the outer header from the tunnel packet to produce a packet with a header, unpacking the packet in response to determining that a tunnel optimization (TO) state corresponding to a flow label contained in a flow label field in the outer header exists at the communications node, and processing the packet. The outer header includes a first source address and a first destination address, and the communications node uses an Internet Protocol version 6 protocol.

In accordance with another embodiment, an apparatus is provided. The apparatus includes means for receiving a message from a communications device at an end of a tunnel, means for processing a packet, and means for producing a tunnel packet by encapsulating the packet with an outer header. The message has a flow label related to a first source address and a first destination address, the packet has the first source address and the first destination address, and the outer header has a second source address and a second destination address. The apparatus also includes means for determining an existence of a tunnel optimization (TO) state corresponding to the first source address and the first destination address, means for compacting the tunnel packet using the flow label based on the first source address and the first destination address, and means for transmitting the tunnel packet to the second destination address.

An advantage of an embodiment is that a care of address may communicate to any number of correspondent nodes, which helps to minimize memory usage and setup overhead.

A further advantage of an embodiment is that each tunnel packet may be significantly reduced in size, which may help improve communications performance of the source-destination pair as well as other communications devices sharing the communications network with the source-destination pair.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a mobile node communicating with a correspondent node through a network using mobile IPv6 (MIPv6) using tunneling. The invention may also be applied, however, to any two communications nodes communicating using IPv6, wherein at least one link in the communications conducted using tunneling.

Figure 1:
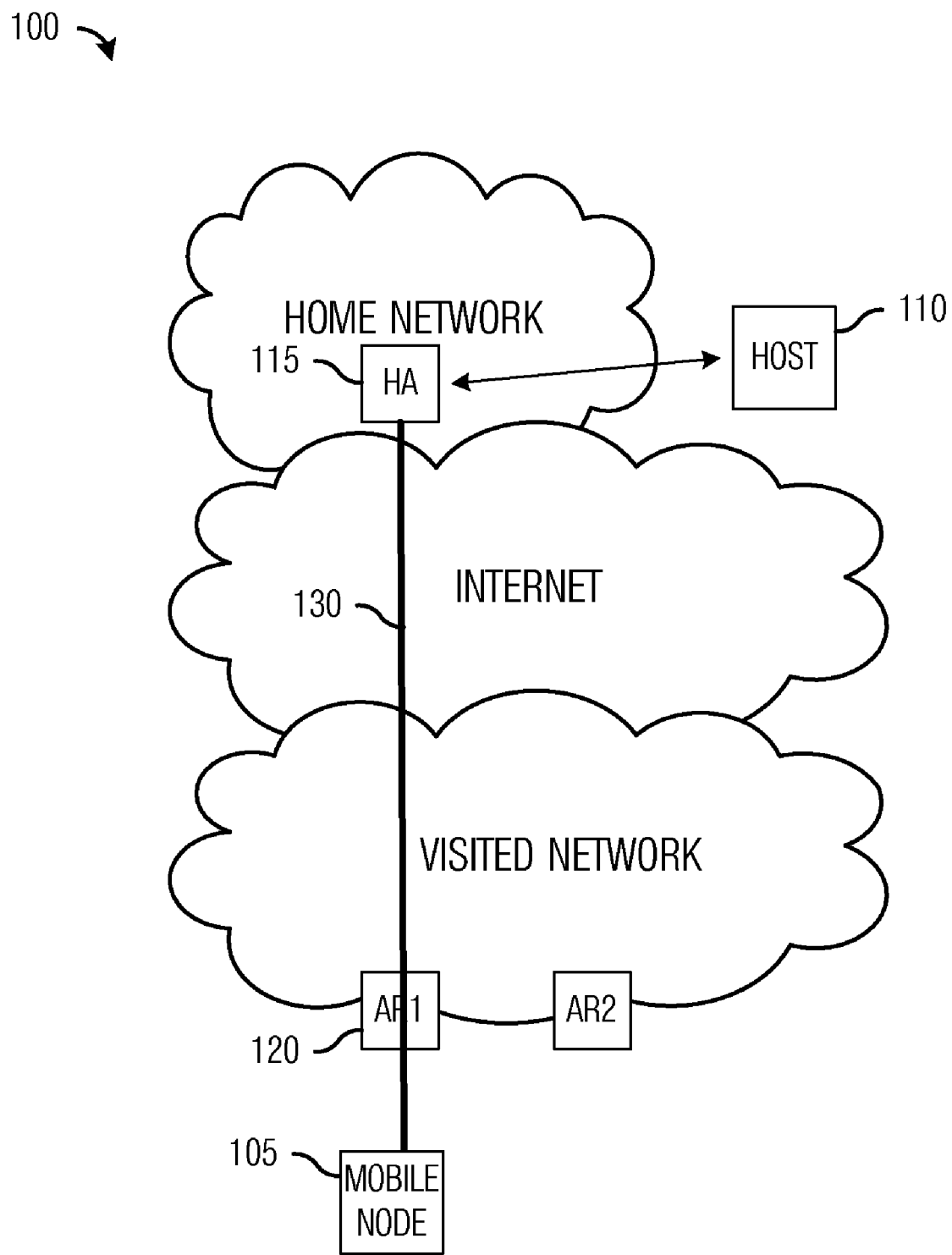
FIG. 1 is a diagram of an internetwork.
Figure 2:
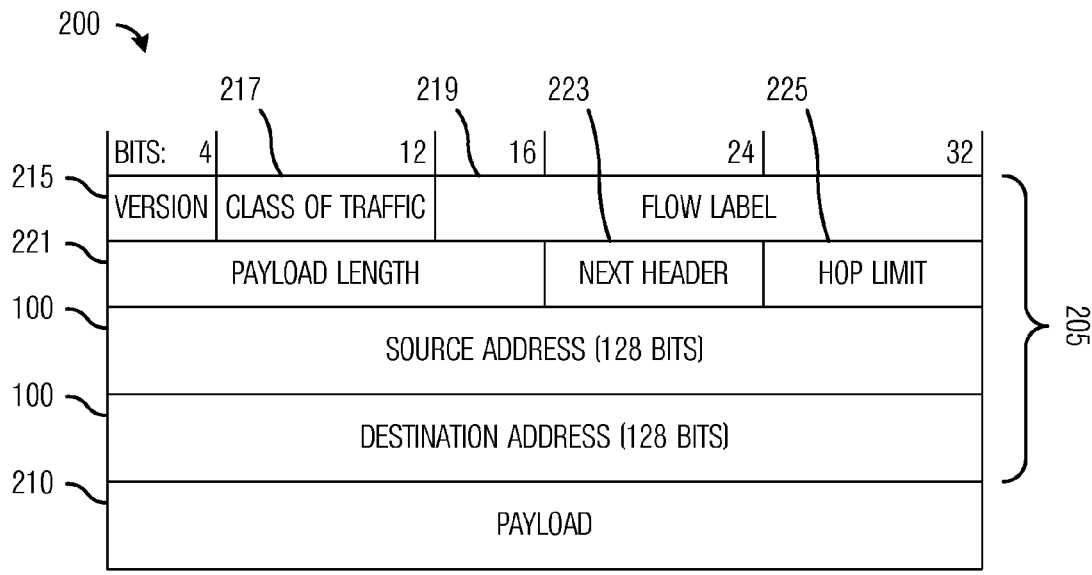
FIG. 2 is a diagram of an Internet Protocol version 6 packet.
Figure 3:
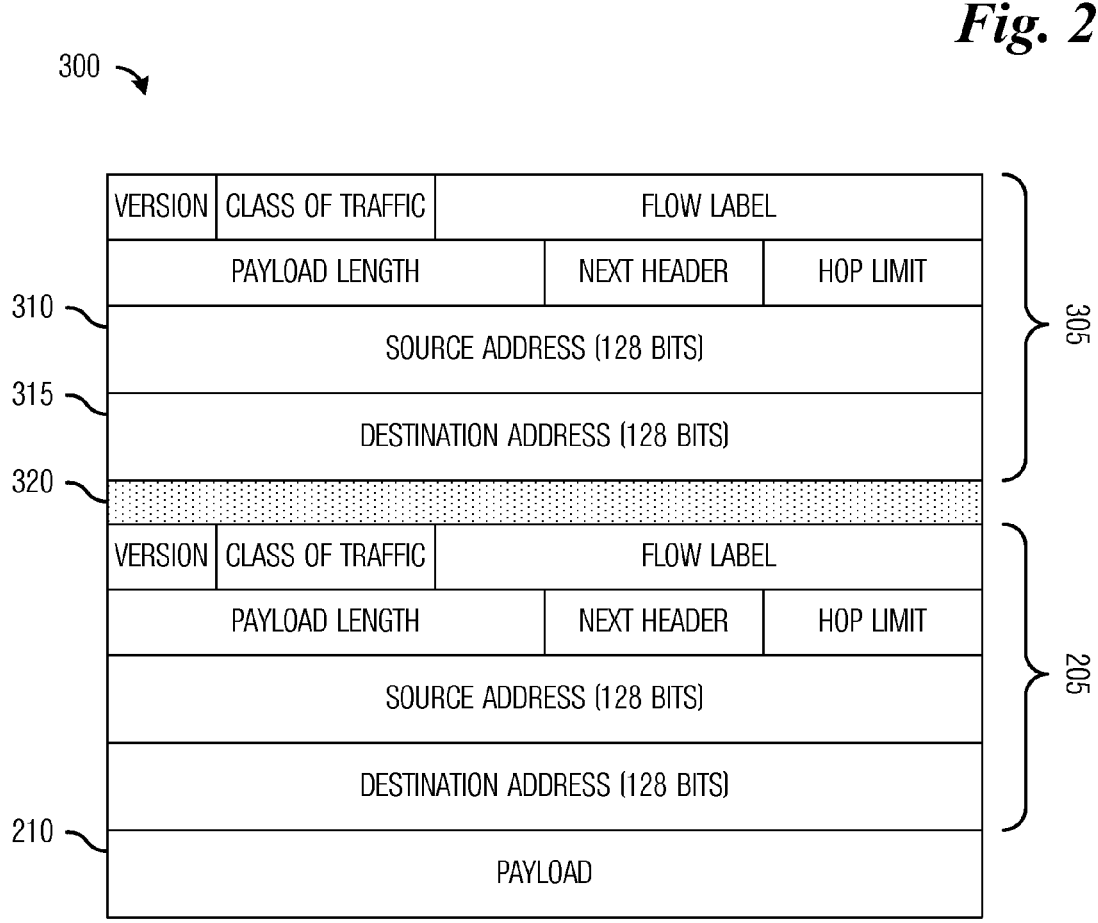
FIG. 3 is a diagram of a tunnel packet.
Figure 4A:
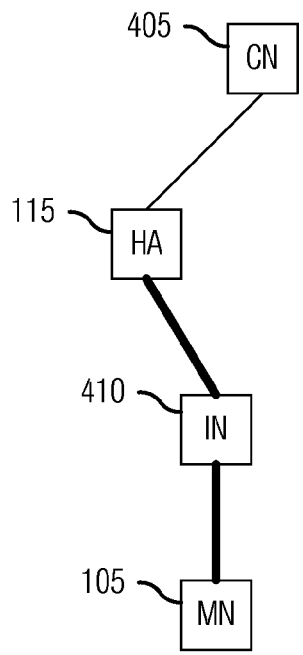
FIGS. 4a and 4b are diagrams of communications paths between a mobile node and a correspondent node.
Figure 4B:
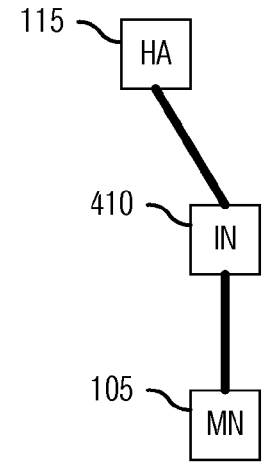

FIG. 4a illustrates a communications path between a MN and a CN, wherein a portion of the communications path uses tunneling. As discussed previously all communications to and from a MN, such as MN 105, must be sent through a HA, such as HA 115, and tunneling is used for message sent between the MN and the HA. However, since the MN is communicating with a CN, such as CN 405, communications leaving the HA and going to the CN as well as communications leaving the CN and going to the HA may not be using tunneling. Additionally, there may be one or more intermediate nodes (IN), such as IN 410, between the MN and the HA. Since the IN lies between the MN and the HA, tunneling is used for communications between the MN and the IN and the IN and the HA, although the tunneling is transparent to the IN. FIG. 4b illustrates a communications path between a MN and a HA, wherein the entirety of the communications path uses tunneling.

Figure 4C:
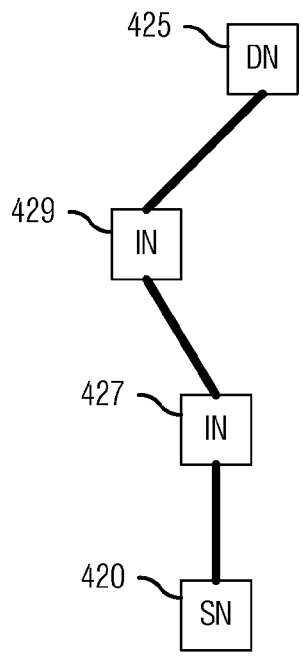
FIGS. 4c and 4d are diagrams of communications paths between a source node and a destination node.
Figure 4D:
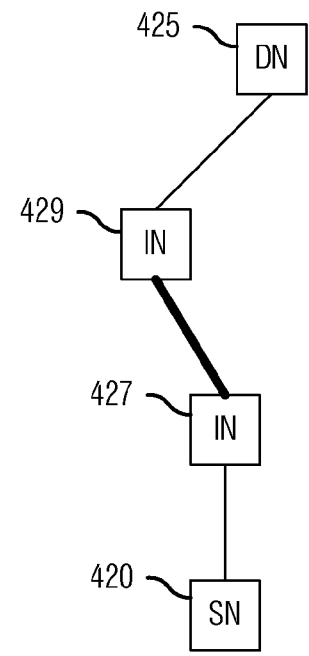

FIG. 4c illustrates a communications path between a source node (SN) and a destination node (DN), wherein an entirety of the communications path between the SN and the DN makes use of tunneling. FIG. 4d illustrates a communications path between a SN and a DN, wherein a portion of the communications path between the SN and the DN makes use of tunneling. As shown in FIG. 4d, a portion of the communications path between IN 427 and IN 429 makes use of tunneling, while a portion of the communications path between SN and IN 427 and between IN 429 and DN 425 does not make use of tunneling.

Figure 5A:
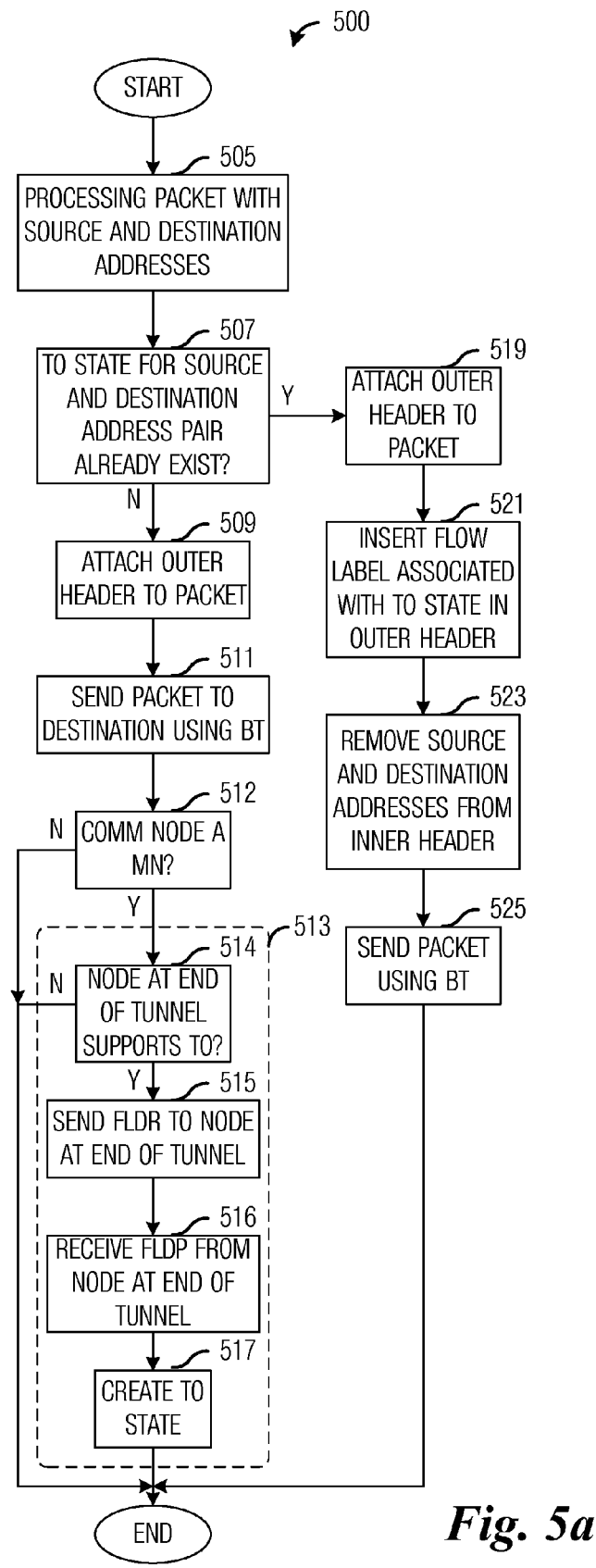
FIG. 5a is a flow diagram of communications node operation at a start of a tunnel, wherein tunnel optimization is utilized to reduce packet header size and bi-directional tunneling is used.

FIG. 5a illustrates a flow diagram of communications node operation 500 at a start of a tunnel, wherein tunnel optimization is utilized to reduce packet header size and bi-directional tunneling is used. Communications node operation 500 may be indicative of operations at a communications node located at a beginning of a tunnel. The communications node at the beginning of the tunnel may be at the beginning of a communications path between a MN and a HA, such as shown in FIG. 4b with the MN being a starting communications node and the HA being an ending communications node, or it may be in the middle of a communications path between a MN and a CN, such as shown in FIG. 4a, with the CN being a starting communications node and the MN being the ending communications node.

Communications node operation 500 may begin with the communications node at the beginning of the tunnel processing a packet with source address and destination address (block 505). If the communications node at the beginning of the tunnel is a MN and the destination of the packet is a HA or CN, then the source address may be a Home Address of the MN and the destination address is an address of the HA or CN. If the communications node at the beginning of the tunnel is a HA and the destination of the packet is a MN, then the source address is an address of the HA and the destination address is the Home Address of the MN.

If the communications node at the beginning of the tunnel is at the beginning of the communications path, then the communications node at the beginning of the tunnel is the communications node that is injecting the packet into the network. While if the communications node at the beginning of the tunnel is not at the beginning of the communications path, then the communications node at the beginning of the tunnel is receiving the packet from another communications node.

The communications node at the beginning of the tunnel may check to determine if a Tunnel Optimization (TO) state for the source-destination pair of the packet exists at the communications node (block 507). In general, a TO state for the source-destination pair will exist if in the past (with a value quantifying the time value of the past being configurable) the communications node has received a packet with the same source-destination pair. Therefore, if the TO state exists for the source-destination pair, then the communications node has previously processed a packet with the same source-destination pair and has created the TO state and the packet was received prior to the TO state having aged to a point where it has been removed.

If the TO state for the source-destination pair does not exist at the communications node (block 507), then the communications node may encapsulate the packet with an outer header to the packet to produce a tunnel packet (block 509). The outer header may have a source address and a destination address that is dependent on the direction of the packet flow. For example, if the communications node at the beginning of the tunnel is a MN, then the outer header may have an address of the MN (such as the care-of-address of the MN) as its source address, and an address the HA as its destination address. While, if the communications node at the beginning of the tunnel is at the HA and the packet originated at the CN, then the outer header may have an address of the HA as its source address and the care-of-address of the MN as its destination address. The populating of the source address and the destination address fields of the outer header may be referred to as completing the tunnel packet. However, no change is made to the header of the packet (i.e., the inner header).

With the outer packet encapsulating the packet, the tunnel packet may be forwarded to the destination as specified by the destination address of the outer header (block 511). According to an embodiment, the tunnel packet may be transmitted to the destination address using bi-directional tunneling (BT). In addition to transmitting the tunnel packet to the destination, the communications node at the beginning of the tunnel (if the communications node at the beginning of the tunnel is a MN (block 512)) may also enter into negotiations with a communications node at the end of the tunnel to determine if TO is to be used (block 513). However, if the communications node at the beginning of the tunnel is not the MN, then no negotiations may take place until the tunnel packet reaches the MN (the communications node at the end of the tunnel), which may then initiate negotiations with the communications node at the beginning of the tunnel.

Negotiations 513 include a Binding Update (BU)/Binding Acknowledgement (BA) exchange to first determine if the destination supports TO (block 514). The BU/BA exchange includes a NEGOTIATION option. The negotiation process is always initiated by the MN. The NEGOTIATION option has the following form:

```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |     Type      |    Length     |
+-+-+-+-+-+-+-+-+-+-+-+-+-+-+-+-+-+-+-+-+-+-+-+-+-+-+-+-+-+-+-+-+
|         Default Flow Label            |  Rsv  |    Status     |
+-+-+-+-+-+-+-+-+-+-+-+-+-+-+-+-+-+-+-+-+-+-+-+-+-+-+-+-+-+-+-+-+
```

Type
  TBD.
Length
  representing the length in octets of the mobility option, not including the Type and Length fields
Default Flow Label
  In BT mode, the label in BU (BA) is used in downlink (uplink) traffic by default. In RO mode, the label in BU is used in the traffic from the CN to the MN, while the label in BA is used in the traffic from the MN to the CN.
Rsv
  Reserved field for future use.
Status
  In BU message, the field SHOULD be ignored. In BA message, the field indicates the result of the negotiation.
  0  Not support TO
  1  Support TO.

If the communications node at the end of the tunnel does not support TO, then communications node operation 500 may then terminate.

If the communications node at the end of the tunnel supports TO, then negotiations 513 further include the communications node at the beginning of the tunnel and may transmit a Flow Label Distribution Request (FLDR) to the communications node at the end of the tunnel (block 515). Preferably, the FLDR may have its A bit set. Furthermore, the FLDR includes a FLOW LABEL option. The A bit may be set in order to install a TO state corresponding to the source-destination pair at the destination.

The FLOW LABEL option has the following form:

```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |     Type      |    Length     |
+-+-+-+-+-+-+-+-+-+-+-+-+-+-+-+-+-+-+-+-+-+-+-+-+-+-+-+-+-+-+-+-+
|              Flow Label               |        Reserved       |
+-+-+-+-+-+-+-+-+-+-+-+-+-+-+-+-+-+-+-+-+-+-+-+-+-+-+-+-+-+-+-+-+
|                            Lifetime                           |
+-+-+-+-+-+-+-+-+-+-+-+-+-+-+-+-+-+-+-+-+-+-+-+-+-+-+-+-+-+-+-+-+
.                       MN's Home Address                       .
.                                                               .
+-+-+-+-+-+-+-+-+-+-+-+-+-+-+-+-+-+-+-+-+-+-+-+-+-+-+-+-+-+-+-+-+
.                                                               .
.                    Correspondent Node Address                 .
.                                                               .
+-+-+-+-+-+-+-+-+-+-+-+-+-+-+-+-+-+-+-+-+-+-+-+-+-+-+-+-+-+-+-+-+
```

Type
  TBD.
Length
  representing the length in octets of the mobility option, not including the Type and Length fields
Flow Label
    If the MN sends FLDR message to the HA, the HA sets the value in this field into the outer IPv6 header of all downlink traffic which has HoA and CN specified in the option. If the HA sends FLDP message as a reply to the MN, the MN sets the value in this field into the outer IPv6 header of all uplink traffic which has HoA and CN specified in the option.
Reserved
    For future use.
Lifetime
    The lifetime of the installed state. The value is greater than 120 seconds, as described in RFC3697.
MN's Home Address
    The home address which the MN is using to communicate with the CN.
Correspondent Node Address
    The CN's address which the MN is communicating with.

The communications node at the end of the tunnel, upon receipt of the FLDR may send back to the communications node at the beginning of the tunnel a Flow Label Distribution Reply (FLDP). Preferably, the FLDP will also have its A bit set. The FLDP also includes the FLOW LABEL option as described above. The receipt of the FLDP with the A bit set at the communications node at the beginning of the tunnel (block 516) may result in the installation of a TO state corresponding to the source-destination pair at the communications node at the beginning of the tunnel (block 517). Communications node operation 500 may then terminate.

Figure 6A:
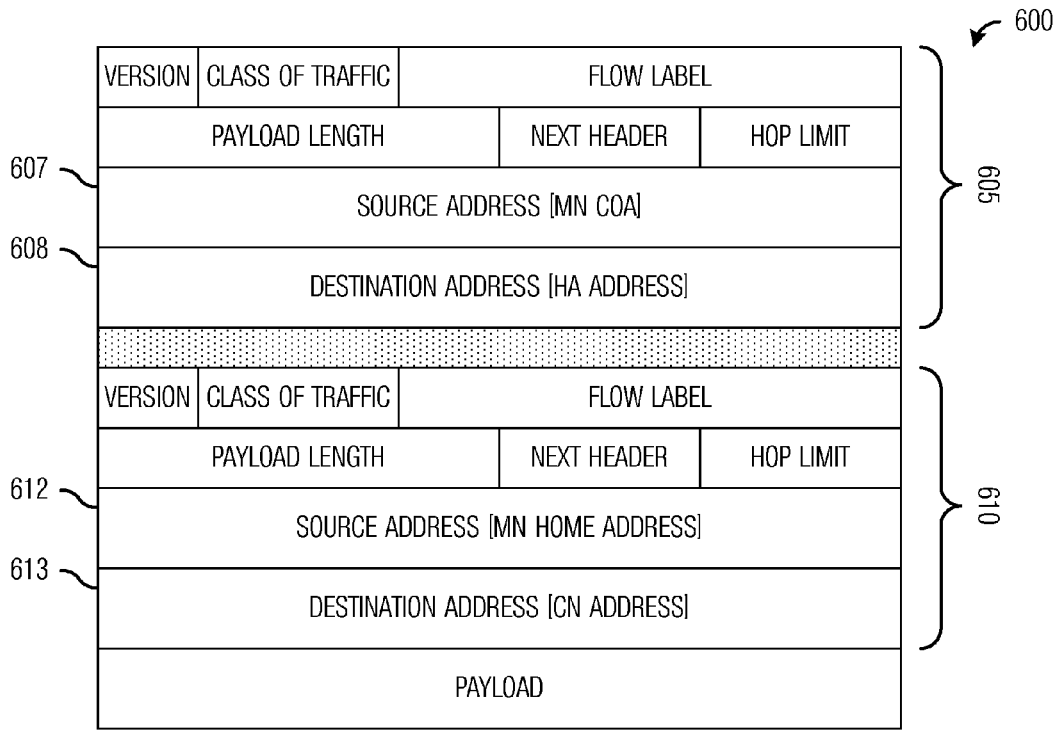
FIG. 6a is a diagram of a tunnel packet, wherein the tunnel packet originates at a mobile node, and tunnel optimization is not used.

FIG. 6a illustrates a tunnel packet 600, wherein tunnel packet 600 originates at a MN, and wherein TO is not used. Tunnel packet 600 includes an outer header 605 and an inner header 610. Outer header 605 includes a source address field 607 that specifies a care-of-address of a communications node at the beginning of the tunnel, which is the MN, and a destination address field 608 that specifies an address of a communications node at the end of the tunnel, which is the HA. Inner header 610 includes a source address field 612 and a destination address field 613 that specifies the source of an actual packet encapsulated by the outer header and the destination of the actual packet (the MN and the CN, respectively).

Figure 6B:
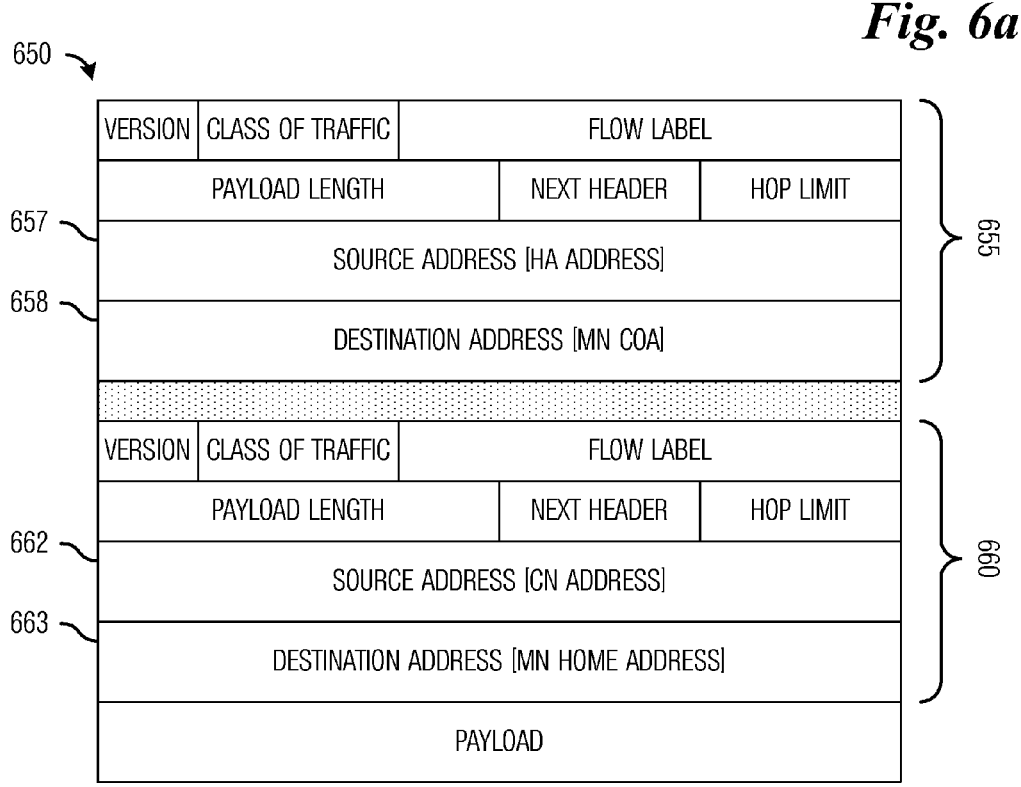
FIG. 6b is a diagram of a tunnel packet, wherein the tunnel packet originates at a correspondent node, and wherein tunnel optimization is not used.

FIG. 6b illustrates a tunnel packet 650, wherein tunnel packet 650 originates at a CN, and wherein TO is not used. Tunnel packet 650 includes an outer header 655 and an inner header 660. Outer header 655 includes a source address field 657 that specifies an address of a communications node at the beginning of the tunnel, which is the HA, and a destination address field 658 that specifies a care-of-address of a communications node at the end of the tunnel, which is the MN. Inner header 660 includes a source address field 662 and a destination address field 663 that specifies the source of an actual packet encapsulated by the outer header and the destination of the actual packet (the CN and the MN, respectively).

Returning now to FIG. 5a, if the TO state for the source-destination pair does exist at the communications node at the beginning of the tunnel (block 507) then the communications node may encapsulate the packet with an outer header to produce a tunnel packet (block 519). The communications node at the beginning of the tunnel may insert a TO flow label corresponding to the TO state into a flow label field of the outer header (block 521) and remove the source address and the destination address fields of the inner header (block 523). The TO flow label may be based on the actual packet's source and destination addresses. The removal of the source address and the destination address fields from the inner header may effectively compact the size of the tunnel packet. The communications node at the beginning of the tunnel may then transmit the tunnel packet (block 525). Communications node operation 500 may then terminate.

Figure 7A:
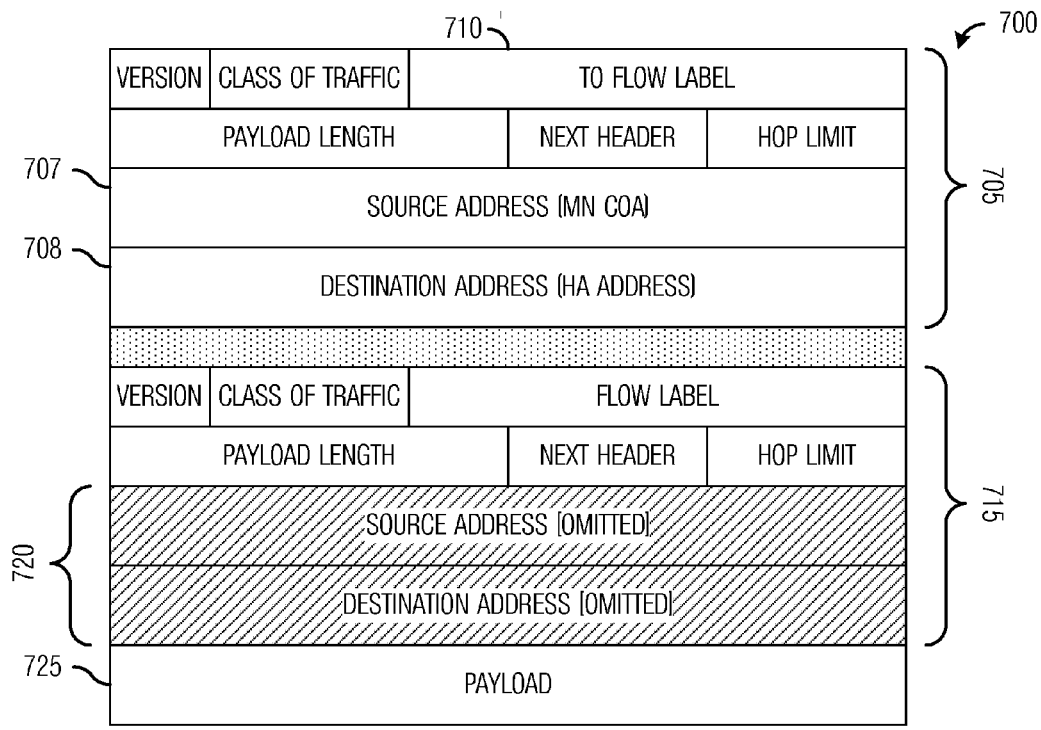
FIG. 7a is a diagram of a tunnel packet, wherein the tunnel packet originates at a mobile node, and wherein tunnel optimization is used to decrease tunnel packet size.

FIG. 7a illustrates a tunnel packet 700, wherein tunnel packet 700 originates at a MN, and wherein TO is used to decrease tunnel packet size. Tunnel packet 700 includes an outer header 705 and an inner header 715. Outer header 705 includes a source address field 707 that specifies a care-of-address of a communications node at the beginning of the tunnel, which is the MN, and a destination address field 708 that specifies an address of a communications node at the end of the tunnel, which is the HA. Outer header 705 also includes a TO flow label 710 that specifies a flow label assigned to a TO state corresponding to the source-destination pair. Inner header 715 has had its source address field and destination address field removed (shown collectively as omitted region 720). With the source address field and destination address field eliminated, payload 725 may be moved up, thereby shortening the overall length of tunnel packet 700 by an amount equal to the combined size of the source address field and the destination address field.

Figure 7B:
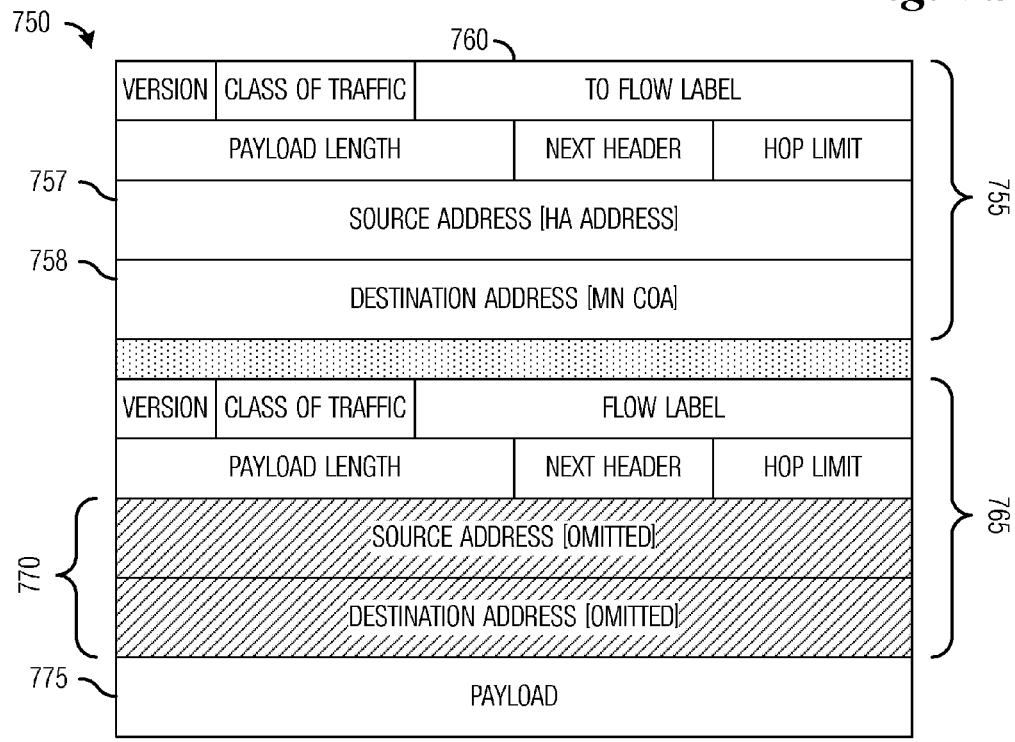
FIG. 7b is a diagram of a tunnel packet, wherein the tunnel packet originates at a correspondent node, and wherein tunnel optimization is used to decrease tunnel packet size.

FIG. 7b illustrates a tunnel packet 750, wherein tunnel packet 750 originates at a CN, and wherein TO optimization is used to decrease tunnel packet size. Tunnel packet 750 includes an outer header 755 and an inner header 765. Outer header 755 includes a source address field 757 that specifies an address of a communications node at the beginning of the tunnel, which is the HA, and a destination address field 758 that specifies a care-of-address of a communications node at the end of the tunnel, which is the MN. Outer header 755 also includes a TO flow label 760 that specifies a flow label assigned to a TO state corresponding to the source-destination pair. Inner header 765 has had its source address field and destination address field removed (shown collectively as omitted region 770). With the source address field and destination address field eliminated, payload 775 may be moved up, thereby shortening the overall length of tunnel packet 750 by an amount equal to the combined size of the source address field and the destination address field.

In an alternative embodiment, not only does the communications node at the beginning of the tunnel remove the source address and the destination address fields of the inner header, but the version field, the class of traffic field, the flow label field, the payload length field, the next header field, and the hop limit field of the inner header may also be removed. At the destination, the communications node may be able to recreate the fields from the outer header. In yet another alternative embodiment, the communications node at the beginning of the tunnel may remove a combination of the fields in the inner header.

Figure 5B:
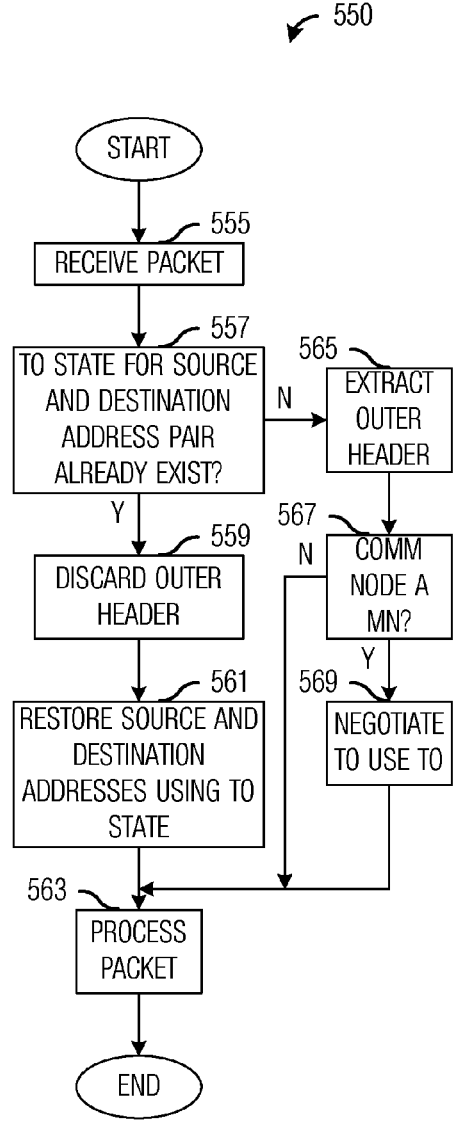
FIG. 5b is a flow diagram of communications node operation at an end of a tunnel, wherein tunnel optimization is utilized to reduce packet header size and bi-directional tunneling is used.

FIG. 5b illustrates a flow diagram of communications node operation 550 at an end of a tunnel, wherein tunnel optimization is utilized to reduce packet header size and bi-directional tunneling is used. Communications node operation 550 may be indicative of operations at a communications node located at an end of a tunnel. The communications node at the end of the tunnel may be at the end of a communications path between a MN and a HA, such as shown in FIG. 4b with the MN being a starting communications node and the HA being an ending communications node, or it may be in the middle of a communications path between a MN and a CN, such as shown in FIG. 4a, with the MN being a starting communications node and the CN being the ending communications node.

Communications node operation 550 may begin with the communications node at the end of the tunnel receiving a tunnel packet with a source address and a destination address in its outer header (block 555). The tunnel packet's outer header may also include a TO flow label if a TO state for the source-destination pair exists, wherein the source-destination pair comprises the addresses of the actual source and destination of a packet encapsulated in the tunnel packet. Otherwise, the outer header may include an ordinary flow label in its flow label field.

The communications node at the end of the tunnel may check to determine if a TO state exists for the source-destination pair (block 557). The communications node at the end of the tunnel may check for the existence of the TO state for the source-destination pair by examining contents of the flow label field in the outer header, for example. If the contents of the flow label field is a TO flow label, then a TO state for the source-destination pair exists and if the contents of the flow label field is not a TO flow label, then a TO state for the source-destination pair does not exist.

If the TO state for the source-destination pair does exist (block 557), then the communications node at the end of the tunnel may simply discard the outer header of the tunnel packet (block 559) and then use the TO state for the source-destination pair to recreate the source address and the destination address for the packet encapsulated in the tunnel packet (block 561). With the packet encapsulated in the tunnel packet restored or uncompacted, the communications node at the end of the tunnel may continue with processing the packet (block 563). Processing of the packet may include forwarding the packet onto its destination or decoding the contents of the packet and acting on the contents. Communications node operations 550 may then terminate.

If the TO state for the source-destination pair does not exist (block 557), then the communications node at the end of the tunnel may extract the outer header of the tunnel packet (block 565). No modifications to the header of the packet may be necessary since no modifications to the header were made. If the communications node at the end of the tunnel is the MN (block 567), then the communications node at the end of the tunnel may negotiate with the communications node at the beginning of the tunnel to use TO (block 569). The negotiations to use TO may be as described previously. If the negotiations to use TO are successful, then a TO state corresponding to the source-destination pair may be created. Then the communications node at the end of the tunnel may continue with processing the packet (block 563). Communications node operations 550 may then terminate.

Figures 8A, 8B:
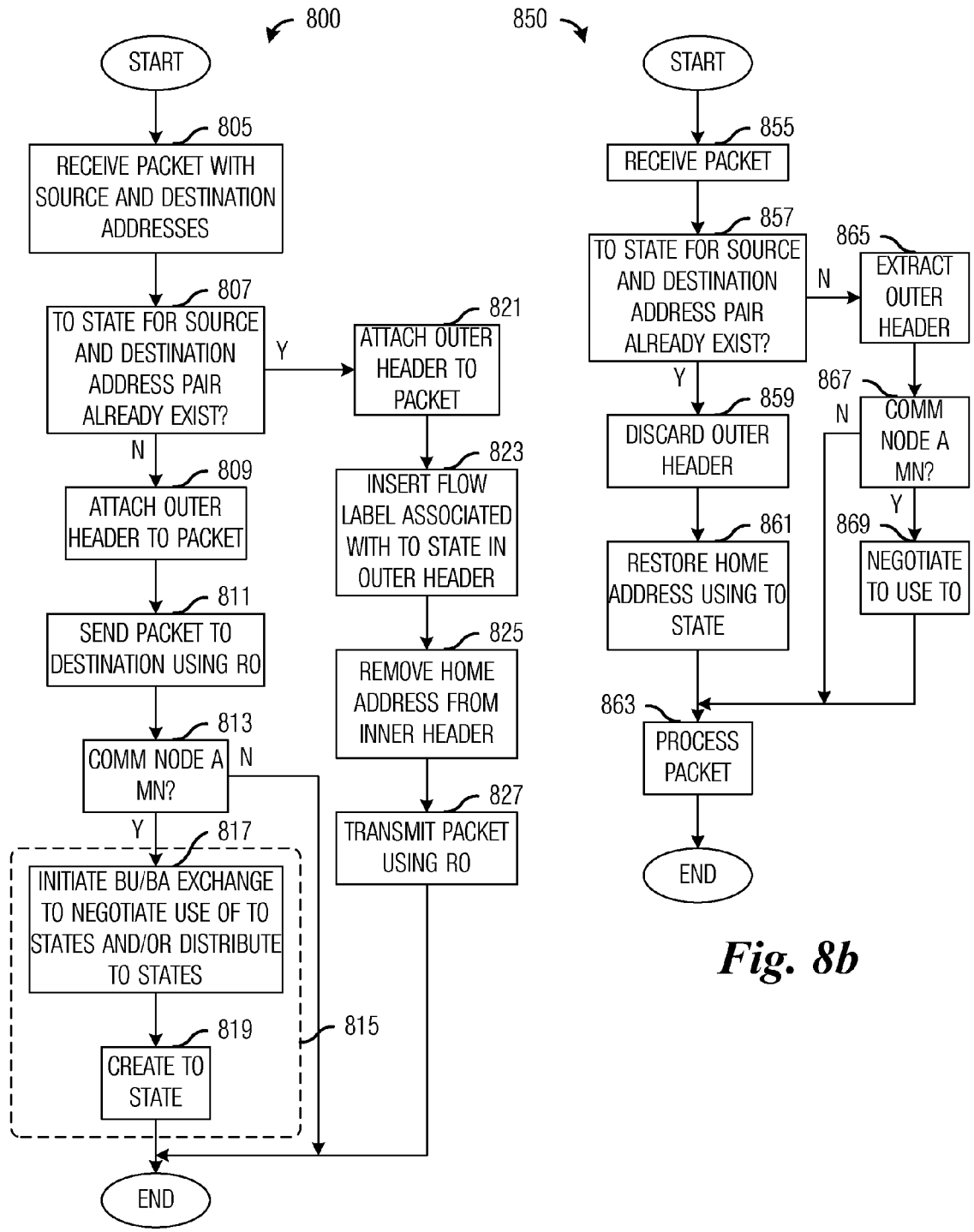
FIG. 8a is a flow diagram of communications node operation at a start of a tunnel, wherein tunnel optimization is utilized to reduce packet header size and route optimization is used.
FIG. 8b illustrates a flow diagram of communications node operation at an end of a tunnel, wherein tunnel optimization is utilized to reduce packet header size and route optimization is used.

FIG. 8a illustrates a flow diagram of communications node operation 800 at a start of a tunnel, wherein tunnel optimization is utilized to reduce packet header size and route optimization is used. Communications node operation 800 may be indicative of operations at a communications node located at a beginning of a tunnel. The communications node at the beginning of the tunnel may be at the beginning of a communications path between a MN and a HA, such as shown in FIG. 4b with the MN being a starting communications node and the HA being an ending communications node, or it may be in the middle of a communications path between a MN and a CN, such as shown in FIG. 4a, with the CN being a starting communications node and the MN being the ending communications node.

Communications node operation 800 may begin with the communications node at the beginning of the tunnel receiving a packet with source address and destination address (block 805). If the communications node at the beginning of the tunnel is at the beginning of the communications path, then the communications node at the beginning of the tunnel is the communications node that is injecting the packet into the network. While if the communications node at the beginning of the tunnel is not at the beginning of the communications path, then the communications node at the beginning of the tunnel is receiving the packet from another communications node.

The communications node at the beginning of the tunnel may check to determine if a Tunnel Optimization (TO) state for the source-destination pair of the packet exists at the communications node (block 807). In general, a TO state for the source-destination pair will exist if in the past (with a value quantifying a value of the past being a configurable value) the communications node has received a packet with the same source-destination pair. Therefore, if the TO state exists for the source-destination pair, then the communications node has previously processed a packet with the same source-destination pair and has created the TO state and the packet was received prior to the TO state having aged to a point where it is removed.

If the TO state for the source-destination pair does not exist at the communications node (block 807), then the communications node may encapsulate the packet with an outer header to the packet to produce a tunnel packet (block 809). The outer header may have a source address and a destination address that is dependent on the direction of the packet flow. For example, if the communications node at the beginning of the tunnel is the MN, then the outer header may have an address of the MN (such as the care-of-address of the MN) as its source address, and an address the HA as its destination address. While, if the communications node at the beginning of the tunnel is at the HA and the packet originated at the CN, then the outer header may have an address of the HA as its source address and a care-of-address of the MN as its destination address. However, no change is made to the header of the packet (i.e., the inner header).

With the outer packet encapsulating the packet, the tunnel packet may be forwarded to the destination as specified by the destination address of the outer header (block 811). According to an embodiment, the tunnel packet may be transmitted to the destination address using route optimization (RO). In addition to transmitting the tunnel packet to the destination, the communications node at the beginning of the tunnel (if the communications node at the beginning of the tunnel is the MN (block 813)) may also enter into negotiations with the destination communications node of the packet to determine if TO is to be used (block 815). However, if the communications node at the beginning of the tunnel is not the MN, then no negotiations may take place until the tunnel packet reaches the MN, which may initiate negotiations with the communications node at the beginning of the tunnel.

Negotiations 815 include a Binding Update (BU)/Binding Acknowledgement (BA) exchange to first determine if the destination supports TO as well as distribute TO states (block 817). The BU/BA exchange includes a NEGOTIATION option. The negotiation process is always initiated by the MN. If the destination supports TO, then a TO state corresponding to the source-destination pair may be created (block 819) and communications node operation 800 may then terminate.

If the TO state for the source-destination pair does exist at the communications node at the beginning of the tunnel (block 807) then the communications node may encapsulate the packet with an outer header to produce a tunnel packet (block 821). The communications node at the beginning of the tunnel may insert a TO flow label corresponding to the TO state into a flow label field of the outer header (block 823) and remove the source address field of the inner header (block 523). The TO flow label may be based on the actual packet's source and destination addresses. The communications node at the beginning of the tunnel may then transmit the tunnel packet using RO (block 827). Communications node operation 800 may then terminate.

FIG. 8b illustrates a flow diagram of communications node operation 850 at an end of a tunnel, wherein tunnel optimization is utilized to reduce packet header size and route optimization is used. Communications node operation 850 may be indicative of operations at a communications node located at an end of a tunnel. The communications node at the end of the tunnel may be at the end of a communications path between a MN and a HA, such as shown in FIG. 4b with the MN being a starting communications node and the HA being an ending communications node, or it may be in the middle of a communications path between a MN and a CN, such as shown in FIG. 4a, with the MN being a starting communications node and the CN being the ending communications node.

Communications node operation 850 may begin with the communications node at the end of the tunnel receiving a tunnel packet with a source address and a destination address in its outer header (block 855). The tunnel packet's outer header may also include a TO flow label if a TO state for the source-destination pair exists, wherein the source-destination pair comprises the addresses of the actual source and destination of a packet encapsulated in the tunnel packet.

The communications node at the end of the tunnel may check to determine if a TO state exists for the source-destination pair (block 857). The communications node at the end of the tunnel may check for the existence of the TO state for the source-destination pair by examining contents of a flow label field in the outer header, for example. If the contents of the flow label field is a TO flow label, then a TO state for the source-destination pair exists and if the contents of the flow label field is not a TO flow label, then a TO state for the source-destination pair does not exist.

If the TO state for the source-destination pair does exist (block 857), then the communications node at the end of the tunnel may simply discard the outer header of the tunnel packet (block 859) and then use the TO state for the source-destination pair to recreate the source address for the packet encapsulated in the tunnel packet (block 861). With the packet encapsulated in the tunnel packet restored, the communications node at the end of the tunnel may continue with processing the packet (block 863). Processing of the packet may include forwarding the packet onto its destination. Communications node operations 850 may then terminate.

If the TO state for the source-destination pair does not exist (block 857), then the communications node at the end of the tunnel may extract the outer header of the tunnel packet (block 865). No modifications to the header of the packet may be necessary since no modifications to the header were made. If the communications node at the end of the tunnel is the MN (block 867), then the communications node at the end of the tunnel may negotiate with the communications node at the beginning of the tunnel to use TO (block 869). The negotiations to use TO may be as described previously. If the negotiations to use TO are successful, then a TO state corresponding to the source-destination pair may be created. Then the communications node at the end of the tunnel may continue with processing the packet (block 863). Communications node operations 850 may then terminate.

Figure 9:
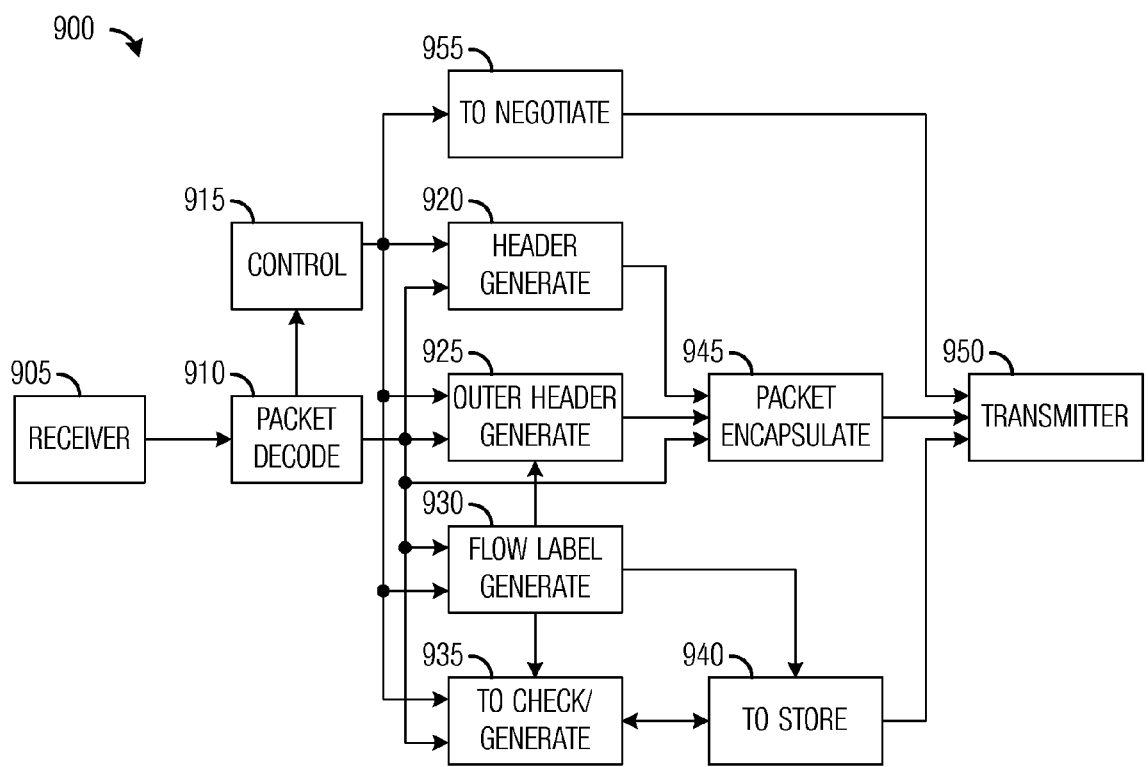
FIG. 9 illustrates a block level view of a communications node.

FIG. 9 illustrates a block level view of a communications node 900. Communications node 900 includes a receiver 905 to receive transmissions. Receiver 905 may be wireless, wired, or both wireless and wired. Receiver 905 may function as a means for receiving messages transmitted to communications node 900, such as binding updates and binding acknowledgements for use in negotiating TO capability and propagating TO states. Received transmissions may be decoded by a packet decode 910, which may partially decode a packet to a point where inner and outer headers are recognizable and contents of fields therein may be processed. A control 915 may be used to control the packet reception and transmission in communications node 900, as well as any additional processing needed to perform packet processing, routing, and so forth. Control 915 may function as means for processing packets, for example, control 915 may be able to inject a packet into a communications network from higher layers of communications node 900, extract a packet from the communications network. Furthermore, control 915 may route packets to other communications nodes based on a destination address of the packets.

Communications node 900 also includes a header generator 920 that may be used to populate fields in a header of a packet. Additionally, header generator 920 may also remove fields from the header of a packet to reduce overall packet size. Header generator 920 may function as a means for compacting a packet by eliminating fields in the header of the packet. For example, header generator 920 may be able to eliminate source address and destination address fields in a header, as well as reconstruct them. Header generator 920 may function as means for completing a packet by filling out fields in a header, such as source/destination, next header, hop limit, payload length, and other fields. An outer header generator 925 may be used to generate an outer header that may be used to encapsulate a packet to generate a tunnel packet. Outer header generator 925 may also be used to populate fields in an outer header.

Also included is a flow label generator 930. Flow label generator 930 may be used to compute a TO flow label based on a source-destination address pair of a packet. A TO check/generate 935 may be used to determine if a TO state corresponding to a source-destination address pair of a packet is in a TO state store 940, i.e., function as a means for determining an existence of a TO state. Additionally, TO check/generate 935 may also function a means for creating a TO state that corresponds to a source-destination address pair. Results of TO check/generate 935 may affect the function of other parts of communications node 900, such as header generate 920, outer header generate 925, flow label generate 930, and so on. TO check/generate 935 may also be used to generate a TO state based on a source-destination address pair.

A packet encapsulate 945 may be used to combine an outer header generated by outer header generate 925 and a packet populated by header generate 920 into a tunnel packet, which may be transmitted by transmitter 950. Packet encapsulate 945 may function as a means for producing a tunnel packet from the outer header and populated packet. Transmitter 950 may be a wireless, wired, or both a wireless and wired transmitter, i.e., function as means for transmitting packets, such as binding updates and binding acknowledgements for use in negotiating TO capability and propagating TO states. A TO negotiate 955 may be used to generate messages, i.e., function as a TO negotiating means, such as FLDR and FLDP messages, to negotiate TO state creation with other communications nodes.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for a communications node operation within a network, wherein the communications node is at a beginning of a tunnel, the method comprising:
   receiving a message from a communications device at an end of the tunnel, the message comprising a flow label related to a first source address and a first destination address;
   processing a packet either injected to the network by the communications node or received from another node in the network, the packet having the first source address and the first destination address;
   encapsulating the packet with an outer header, thereby producing a tunnel packet, the outer header having a second source address and a second destination address;
   compacting the tunnel packet based on a tunnel optimization (TO) state if the communications node has created and stored a TO state when previously processing another packet with a same source and destination addresses as the first source address and the first destination address and the TO state has not been removed; and
   transmitting the tunnel packet towards the second destination address, wherein the second destination address comprises an address of the communications device at the end of the tunnel;
   wherein the communications node supports an Internet Protocol version 6 protocol.

2. The method of claim 1, wherein transmitting the tunnel packet uses bi-directional tunneling.

3. The method of claim 1, wherein the communications node is a mobile node (MN) and the communications device at the end of the tunnel is a home agent (HA), and wherein the compacting the tunnel packet comprises:
   inserting the flow label into a flow label field of the outer header;
   using a care-of-address of the MN as the second source address and an address of the communications device at the end of the tunnel as the second destination address; and
   eliminating a source address field containing the first source address and a destination address field containing the first destination address in a portion of the tunnel packet corresponding to the packet.

4. The method of claim 1, wherein the communications node is a home agent (HA) and the communications device at the end of the tunnel is a mobile node (MN), and wherein the compacting the tunnel packet comprises:
   inserting the flow label into a flow label field of the outer header;
   using an address of the HA as the second source address and an address of the communications device at the end of the tunnel as the second destination address; and
   eliminating a source address field containing the first source address and a destination address field containing the first destination address in a portion of the tunnel packet corresponding to the packet.

5. The method of claim 1, further comprising, completing the tunnel packet in response to determining that the TO state corresponding to the first source address and the first destination address does not exist at the communications node.

6. The method of claim 5, wherein the communications node is a home agent (HA) and the communications device at the end of the tunnel is a mobile node (MN), and wherein the completing the tunnel packet comprises using an address of the HA as the second source address and a care-of-address of the MN as the second destination address.

7. The method of claim 5, wherein the communications node is a mobile node (MN) and the communications device at the end of the tunnel is a home agent (HA), and wherein the completing the tunnel packet comprises using a care-of-address of the MN as the second source address and an address of the HA as the second destination address.

8. The method of claim 7, further comprising, in response to determining that the TO state corresponding to the source address and the destination address does not exist at the communications node:
   negotiating the use of TO with the communications device at the end of the tunnel; and
   creating a TO state corresponding to the first source address and the first destination address.

9. The method of claim 8, wherein negotiating the use of TO comprises:
   sending a binding update to the communications device at the end of the tunnel, wherein the binding update includes an option for negotiating TO capability; and
   receiving a binding acknowledgement from the communications device at the end of the tunnel, wherein the binding acknowledgement includes the option for negotiating TO capability.

10. The method of claim 8, wherein creating the TO state comprises:
    sending a flow label distribution request to the communications device at the end of the tunnel, wherein the flow label distribution request includes an option for flow label information;
    receiving a flow label distribution reply from the communications device at the end of the tunnel, wherein the flow label distribution reply includes the option for flow label information; and
    creating the TO state from the flow label.

11. A method for a communications node operation, wherein the communications node is at an end of a tunnel, the method comprising:
    receiving a tunnel packet having an outer header, wherein the outer header comprises a first source address and a first destination address;
    extracting the outer header from the tunnel packet, thereby producing a packet having an inner header;
    unpacking the packet if the communications node has created and stored a TO state when previously processing another packet with a same source and destination addresses as the first source address and the first destination address contained in a flow label within a flow label field in the outer header and the TO state has not been removed; and
    processing the packet;
    wherein the communications node supports an Internet Protocol version 6 protocol.

12. The method of claim 11, wherein unpacking the packet comprises, restoring a second source address in a source address field in the header of the packet and a second destination address in a destination address field of the header of the packet based on the flow label.

13. The method of claim 12, wherein processing the packet comprises, in response to determining the second destination address is not an address of the communications node, transmitting the packet towards the second destination address.

14. The method of claim 11, wherein determining that the TO state exists comprises examining the flow label in the flow label field in the outer header.

15. An apparatus within a network comprising:
a receiver configured to receive a message from a communications device at an end of a tunnel, the message having a flow label related to a first source address and a first destination address;
a controller coupled to the receiver, the controller configured to process a packet either injected to the network by the apparatus or received from another node in the network, the packet having the first source address and the first destination address;
a packet encapsulate unit coupled to the controller, the packet encapsulate unit configured to produce a tunnel packet by encapsulating the packet with an outer header, the outer header having a second source address and a second destination address;
a tunnel optimization (TO) check unit coupled to the controller, the TO check unit configured to determine if the communications node has created and stored a TO state when previously processing another packet with a same source and destination addresses as the first source address and the first destination address and the TO state has not been removed;
a header generate unit coupled the controller, the header generate unit configured to compact the tunnel packet using the flow label based on the first source address and the first destination address; and
a transmitter coupled to the packet encapsulate unit, the transmitter configured to transmit the tunnel packet to the second destination address.

16. The apparatus of claim 15, wherein the transmitter is further configured to transmit the tunnel packet using bi-directional tunneling.

17. The apparatus of claim 15, wherein the header generate unit is further configured to complete the tunnel packet.

18. The apparatus of claim 17, wherein the TO check unit is further configured to create a TO state corresponding to the first source address and the first destination address, the apparatus further comprising, a TO negotiate unit coupled to the controller, the TO negotiate unit configured to negotiate the use of TO with a communications node at the second destination address.

19. The apparatus of claim 18, wherein the transmitter is further configured to send a binding update to the communications node at the second destination address, wherein the binding update includes an option for negotiating TO capability, and wherein the receiver is further configured to receive a binding acknowledgement from the communications node at the second destination address, wherein the binding acknowledgement includes the option for negotiating TO capability.

20. The apparatus of claim 15, wherein the header generate unit is further configured to eliminate a source address field and a destination address field in a portion of the tunnel packet corresponding to the packet, and wherein the header generate unit comprises, an outer header generate unit coupled to the controller, the outer header generate unit configured to insert the flow label into a flow label field of the outer header, and to populate a source address field and a destination address field of the outer header.

* * * * *